UNITED STATES PATENT OFFICE.

GEORGE C. BAILEY, OF WOODCLIFF-ON-HUDSON, CHARLES W. FISCHER, OF GRANTWOOD, NEW JERSEY, AND JOHN F. W. SCHULZE, OF EDGEWOOD, MARYLAND, ASSIGNORS TO THE BARRETT COMPANY, A CORPORATION OF NEW JERSEY.

PURIFICATION OF SUBSTANCES BY DISTILLATION WITH A SOLVENT.

1,424,138.     Specification of Letters Patent.     Patented July 25, 1922.

No Drawing.     Application filed February 9, 1921. Serial No. 443,674.

*To all whom it may concern:*

Be it known that we, GEORGE C. BAILEY, CHARLES W. FISCHER, and JOHN F. W. SCHULZE, citizens of the United States, residing at (1) Woodcliff-on-Hudson, New Jersey, (2) Grantwood, New Jersey, and (3) Edgewood, Maryland, in the counties of (1) Bergen, (2) Bergen, and (3) Harford, and States of (1) New Jersey, (2) New Jersey, and (3) Maryland, have invented certain new and useful Improvements in Purification of Substances by Distillation with a Solvent, of which the following is a specification.

The object of this invention is to purify high-boiling impure substances which are not readily purified by steam or vacuum distillation. More particularly and as applied to a specific substance, the object of this invention is to purify maleic acid, especially that produced by the catalytic oxidation of benzene or that in which benzoquinone or decomposition products of the same are present.

A well known, long recognized method of purifying high boiling materials decomposable at their normal boiling points is the process of steam distillation. This process is usually far more simple than a vacuum distillation which would accomplish practically the same results, namely, to permit the distillation of the substances at a lower temperature, the lower temperature being that at which decomposition will not result, since when two immiscible liquids are to be distilled the boiling point will be the temperature at which the sum of the two partial vapor pressures is equal to the external pressure. Thus it is a considerable advantage to employ steam distillation in cases where the substances are insoluble or difficultly soluble in water to secure the additive effect of the vapor pressures. Furthermore, steam distillation is usually applied to distillable substances, insoluble or difficultly soluble in water, so that when the steam and the vapor of the substance carried with the steam are condensed the condensed liquids will separate into layers and thus be easily isolated from each other and recovered. With distillable substances which are readily soluble in water the above advantages are not marked and vacuum distillation is usually employed. However, a substance may contain impurities which volatilize with the distillable product and thus contaminate the distillate. Redistillation or fractionation is possible but where high boiling substances are treated considerable loss results from their retreatments.

We have discovered a process whereby certain defects in these methods of purification are avoided. This process makes use of a material in distilling a substance, said material not dissolving said substance to an appreciable extent but being a solvent for volatile impurities in said substance, said material also being such that said substance may be readily recovered from it after the distillation has taken place. The material used to aid the distillation should preferably have a sufficiently high boiling point, as compared to the boiling point of the substance to be purified, to permit ready distillation of the substance with substantially no detrimental decomposition of said substance.

The invention will be more particularly described in connection with the distillation or purification of maleic acid in which a coal tar solvent, such as xylol for example, is used to aid in the distillation, but it is to be understood that the invention is not restricted to the particular substances or materials mentioned.

In the catalytic oxidation of benzene to maleic acid as disclosed in U. S. Patent No. 1,318,633 to Weiss and Downs, besides maleic acid, benzoquinone is a product of the oxidation. The amount may vary according to running conditions but the ratio of maleic acid to benzoquinone has been found in many cases to be approximately 10 to 1.

In the receiver in which the maleic acid is removed from the vapor stream coming from the catalyst reaction chamber by means of some absorbent liquid such as water, there is collected maleic acid and benzoquinone. The continuous passage of the excess oxygen from the oxidizer over or through the receiver soon decomposes the benzoquinone in part or entirely into dark colored products of unknown composition. Upon regaining the maleic acid by evaporation of the absorbent liquid the maleic acid is colored very dark by these decomposition products.

Maleic acid is very soluble in water, e. g., 78 parts will dissolve in 100 parts of water at about 25° C. It melts at 130° C. If heated carefully it can be distilled under atmospheric pressure at approximately 196° C. The acid is almost insoluble in benzene, toluene and similar coal-tar solvents, but the anhydride of maleic acid is appreciably soluble, e. g. 0.008 parts of maleic acid will dissolve in 100 parts of xylene at 25° C. and about 20 parts of maleic acid anhydride will dissolve in 100 parts of xylene at 25° C.

Maleic acid may be distilled with or without vacuum in a small way but there are serious objections to this method of purification on a larger scale. It is known that maleic acid upon long continued heating is converted to fumaric acid, an isomer of high melting point and slight solubility in water. Fumaric acid is extremely difficult to distill or sublime. Moreover the crude maleic acid contains some inert material resulting from the benzoquinone. When a large scale distillation is attempted part of the maleic acid distills and a part is converted into and collects in the still as crude fumaric acid. The mass or proportion of this residue will depend upon the factors of the distillation such as type of still, temperature, time of heating, etc. The mass of inert material in the still is a poor conductor of heat and if more crude maleic acid be fed into this residue, a smaller fraction of the acid will distill and more will be converted into fumeric acid or carbonized into decomposition products. Moreover, the distillate is often colored from dust and colored impurities carried over from the still. Since the impurities are intimately mixed with the distillate there is no ready means of removing them to improve the color, except a redistillation, which is a very expensive, slow and uneconomical procedure. Washing the distillate with various solvents involves a loss of solvent and does not improve the color of the product. Hence a vacuum distillation, unless carried out under carefully controlled conditions and in special apparatus, is not a suitable or economical method of purifying maleic acid containing any appreciable amount of impurities.

Moreover, as maleic acid is extremely soluble in water and as the rate of transfer at 100° C. is small, steam distillation is too slow to be of any importance commercially.

We apply our invention to the purification of maleic acid as follows: The dry impure acid or a concentrated water solution of the acid is distilled with an organic solvent in which the maleic acid is difficultly soluble and the benzoquinone is appreciably soluble, such a solvent is xylol, but other solvents may be used such as toluol, solvent naphtha, heavy solvent naphtha, petroleum distillates, etc. Maleic acid anhydride may be soluble in these organic solvents.

During the distillation the uncombined water present in the crude maleic acid and the combined water of the acid are drawn over with the solvent at the first of the run, leaving maleic acid anhydride in the still to be carried over during the last part of the distillation. This is a marked advantage as the anhydride does not revert to fumaric acid upon heating. Furthermore, this process possesses an advantage in that if benzoquinone or other colored impurities distill over with the solvent, the solvent holds them in solution and the maleic acid which separates is not contaminated by them. As stated above, when it is attempted to evaporate the water solution of crude maleic acid and dry the acid, the benzoquinone present is almost entirely all converted to black products which do not distill readily unless heated very much above the boiling point of maleic acid anhydride. The solvent distillation avoids the necessity of this overheating. Also by the solvent distillation the separation of the impurities is quite simple as the solvent holds the colored products in solution, and the maleic acid itself, being insoluble in the solvent used for distillation, separates from the solvent free from color when the distillates are condensed and allowed to stand. This advantage would not be possible in the case of steam distillation as the maleic acid is too soluble to crystallize from the water solution free from colored products, and in the vacuum distillation as pointed out above, a re-distillation is necessary to remove such color.

The process may be carried on in the usual type of apparatus used in steam distillation, i. e. the vapors of the organic solvent or solvent and water may be led from a boiler through the still which contains the crude maleic acid. The vapors from the still are then condensed and the maleic acid regained from the solvent by filtering off the separating solid or washing the solvent with water and separating the two immiscible liquids. Also the solvent may be placed in the still with the crude maleic acid and the solvent and acid distilled over together from the same vessel. The form of apparatus and the methods of manipulation may be varied according to the skill of the operator without departing from the scope of the invention.

It is also possible to superheat the solvent vapors. For example, if the maleic acid is held at a still temperature of 160°-170° C., the solvent vapors such as xylene or similar coal tar solvent, may be superheated upon coming from the boiler before passing into the still in the same fashion as steam is superheated. In this way more maleic acid per pound of solvent will be carried over than if the solvent were not superheated. The lower the molecular weight of the solvent the relatively more acid per pound of solvent will be transferred with the vapors. A constant boiling mixture of hydrocarbon and water vapor may be substituted for the hydrocarbon solvent and these vapors superheated as stated above. Other variations may suggest themselves to one skilled in the art of distillation, and we do not intend to be limited by the examples given.

We claim:

1. The process of purifying impure maleic acid, which comprises distilling said acid in the presence of a coal tar solvent in which the impurity is soluble and in which solvent maleic acid is difficultly soluble.

2. The process of purifying impure maleic acid, which comprises distilling said acid in the presence of a coal tar solvent of high boiling point in which the impurity is soluble and in which solvent maleic acid is difficultly soluble.

3. The process of purifying impure maleic acid, which comprises distilling said acid in the presence of xylol.

4. The process of purifying impure maleic acid, which comprises distilling a water solution of said acid in the presence of a coal tar solvent in which the impurity is soluble and in which solvent maleic acid is difficulty soluble.

5. The process which comprises distilling maleic acid mixed with an impurity in the presence of a solvent for said impurity and in which solvent maleic acid is difficultly soluble.

6. The process of purifying maleic acid mixed with benzoquinone, which comprises distilling said acid in the presence of a solvent for said benzoquinone.

7. The process which comprises distilling maleic acid mixed with an impurity in the presence of a coal tar solvent for said impurity and in which solvent maleic acid is difficultly soluble.

8. The process of purifying maleic acid mixed with benzoquinone, which comprises distilling said acid in the presence of xylol.

In testimony whereof we affix our signatures.

GEORGE C. BAILEY.
CHARLES W. FISCHER.
JOHN F. W. SCHULZE.